US010557993B1

(12) United States Patent
Wang et al.

(10) Patent No.: US 10,557,993 B1
(45) Date of Patent: Feb. 11, 2020

(54) FOCUSING MECHANISM FOR BIOSIGNALS MEASUREMENT WITH MOBILE DEVICES

(71) Applicant: CMOS Sensor, Inc., Cupertino, CA (US)

(72) Inventors: Weng Lyang Wang, Saratoga, CA (US); Jason Wu, Daly City, CA (US); Sun-Teck See, San Jose, CA (US)

(73) Assignee: CMOS Sensor, Inc., Cupertino, CA (US)

( * ) Notice: Subject to any disclaimer, the term of this patent is extended or adjusted under 35 U.S.C. 154(b) by 0 days.

(21) Appl. No.: 16/118,117

(22) Filed: Aug. 30, 2018

(51) Int. Cl.
*G02B 6/32* (2006.01)
*H04M 1/02* (2006.01)
*G02B 6/42* (2006.01)
*F21V 8/00* (2006.01)

(52) U.S. Cl.
CPC ............ *G02B 6/325* (2013.01); *G02B 6/0025* (2013.01); *G02B 6/4259* (2013.01); *H04M 1/0266* (2013.01)

(58) Field of Classification Search
CPC .... G02B 6/325; G02B 6/0025; G02B 6/4259; H04M 1/0266
USPC .......................................................... 385/33
See application file for complete search history.

(56) References Cited

U.S. PATENT DOCUMENTS

2014/0364218 A1* 12/2014 Holmgren ............... G01S 17/88
463/31

* cited by examiner

*Primary Examiner* — Jerry M Blevins
(74) *Attorney, Agent, or Firm* — Joe Zhang

(57) ABSTRACT

A focusing mechanism or module is designed to reduce the size of an optical lens-based focusing system that would be otherwise used in a portable device. According to one aspect of the present invention, the focusing mechanism includes a light guide with first and second sides. The light guide includes a plurality of light passages slanted inwardly formed evenly from the first side towards a center of the second side, wherein the light guide, disposed on top of the image sensor, collects a reflected light from a human body part and focuses the reflected light onto the image sensor, each of photosensors generates an proportional charge from the reflected light.

17 Claims, 15 Drawing Sheets

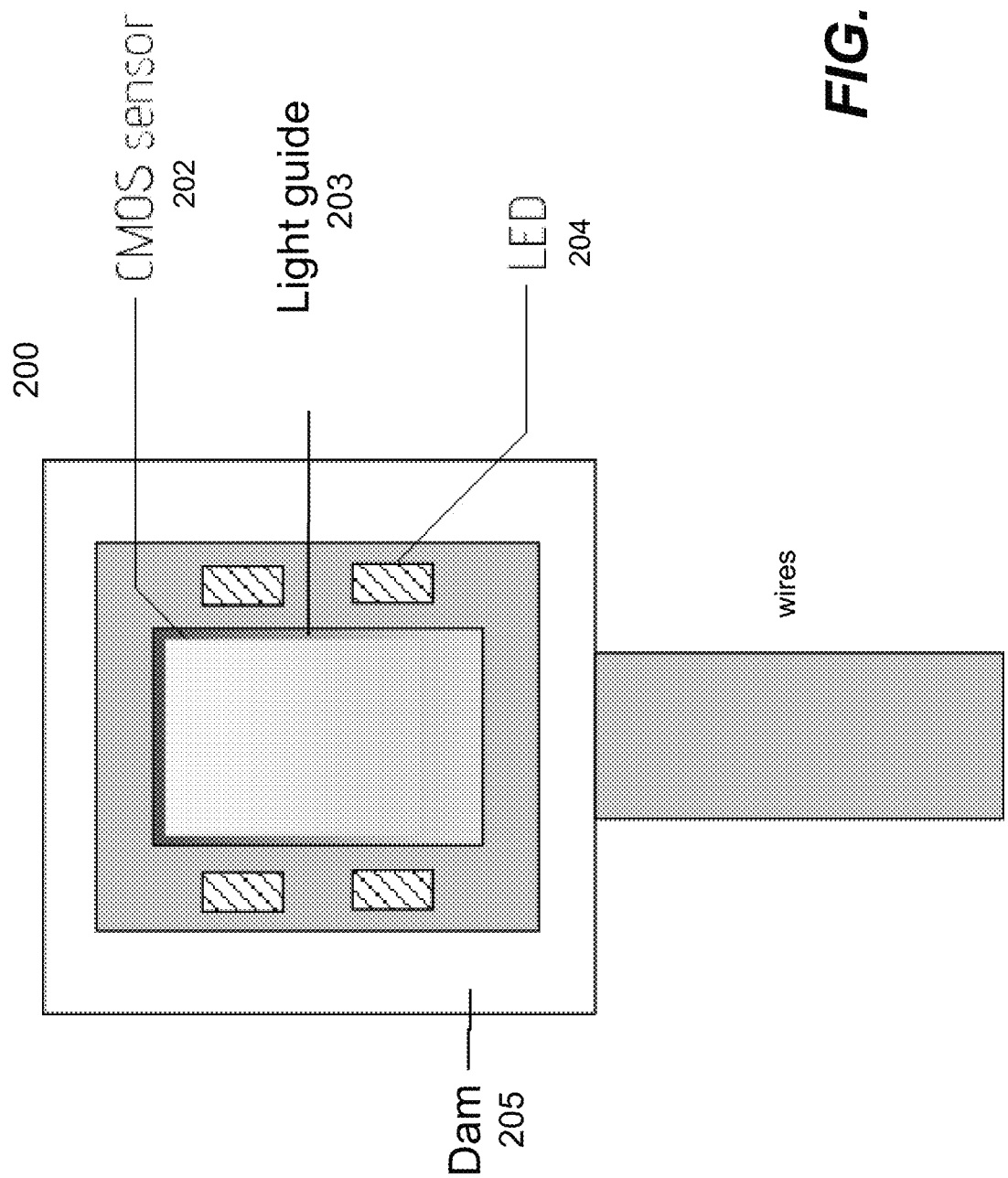

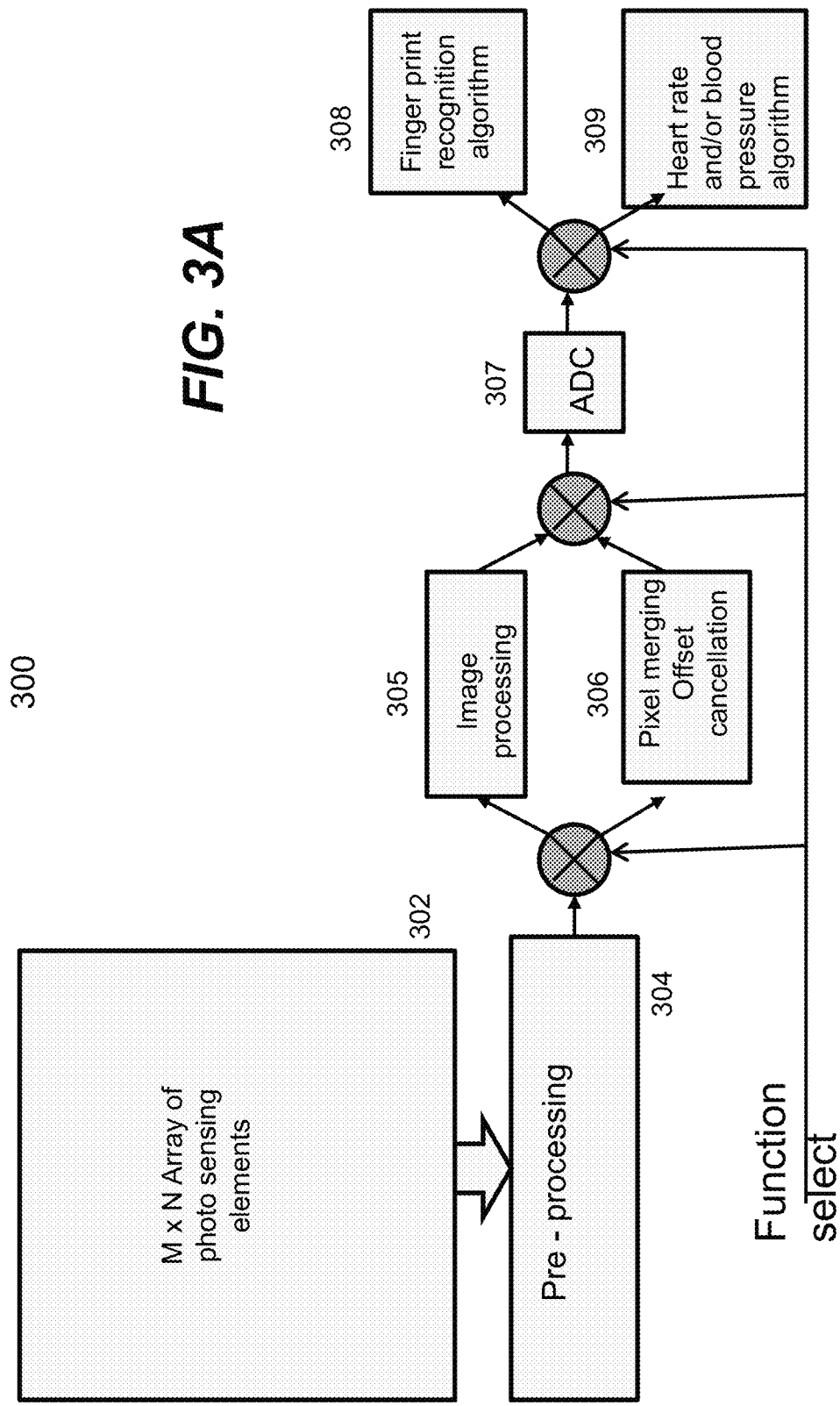

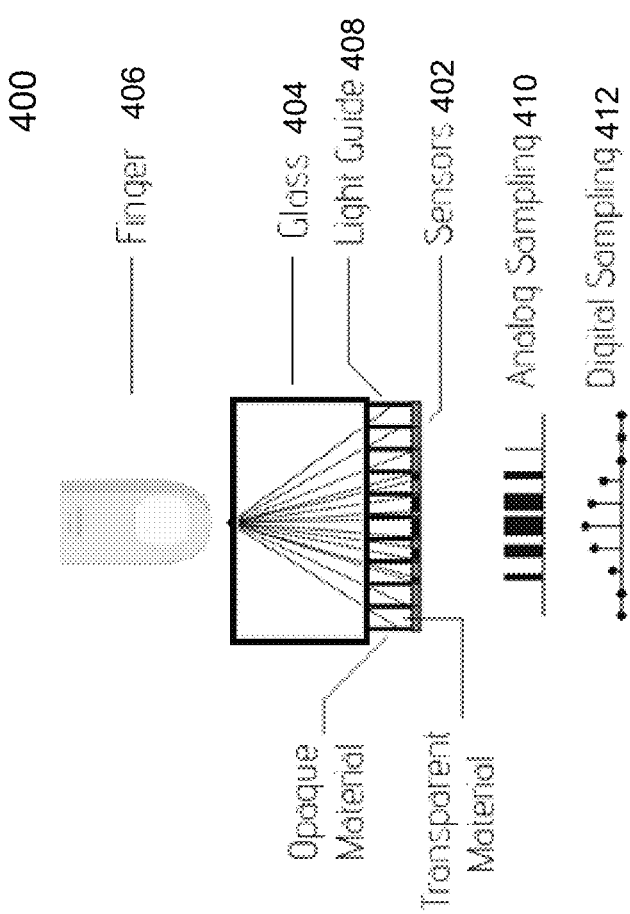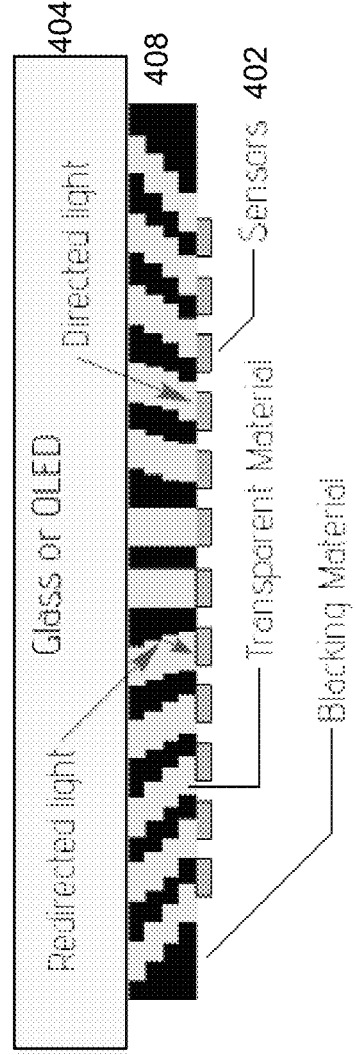

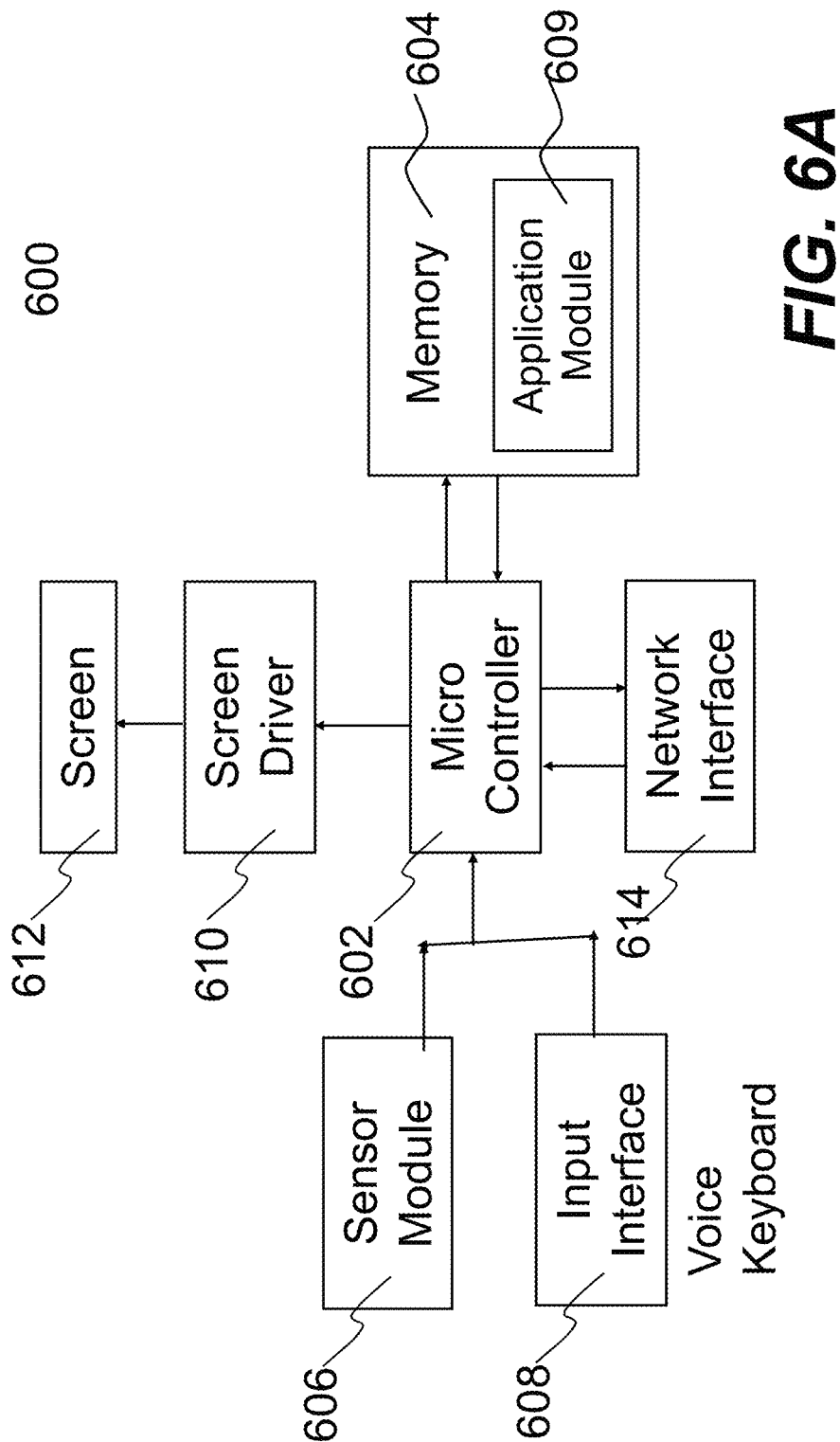

FOCUSING MECHANISM FOR BIOSIGNALS MEASUREMENT WITH MOBILE DEVICES

BACKGROUND OF THE INVENTION

1. Field of the Invention

The present invention is related to the area of image sensors. More particularly, the present invention is related to an optical sensor, circuitry for such sensors, and a light source for acquiring biosignals from a human body part (e.g., a finger).

2. Description of Related Art

Smart phones have become the fastest-selling gadgets in history, outstripping the growth of the simple mobile phones that preceded them many years ago. Today about half the adult population owns a smart phone; by 2020, 80% will. Smart phones have also penetrated every aspect of daily life. With proper applications, a smart phone can fulfill the needs for a telephone, digital camera and video camera, GPS navigation, a media player, clock, news, calculator, web browser, handheld video game player, flashlight, compass, an address book, note-taking, digital messaging, an event calendar, and etc. With the rapid improvement of hardware and software in smart phones, the need and development of point-of-care testing (POC Testing) based on the smart phones is rapidly growing.

Point-of-care (POC) testing, originally referred to as bedside testing, is defined as medical diagnostic testing at or near a point of care, that is, at the time and place of patient care. The POC testing contrasts with the tradition in which testing was wholly or mostly confined to a medical laboratory, thus requiring a patient to travel away from home. Now with a smart phone equipped with certain sensors and loaded with certain applications, many simple medical tests could be performed anywhere close to the patient.

The driving notion behind the POC testing is to bring some medical tests conveniently and immediately to a patient, which increases the likelihood that the patient, his/her physician or care team receives the results quickly, for possible clinical management or decisions if needed. Although still limited in the types of the POC tests that may be conducted by a patient him/herself, a smart phone is mainly used in biosensing assays, acting as detectors, data processors, and even signal inducers with or without an additional custom designed cradle or attachment used to mount other components.

Almost all smart phones have an image sensor. One application of the image sensor in the field of biometrics is to verify an identity of a user by capturing an image of the user, for example, a body part (e.g., skin, finger, eye or face) so as to wake up a device, activate an application and pay bills. Typical biometric measurement is based on digitized images of fingerprints, iris patterns in the eye, hand shape, or hand vein patterns as a basis for identity verification. However, the image sensor used for the biometric applications is the one primarily designed for photos or videos, typically in high-resolution and low sensitive to biological changes (e.g., inferred or heat in a finger), they are not ideal for some common biological measurements, such as heart rate and blood pressure. Thus there is a need for sensors that are low in cost but sensitive to the biological changes on a body part.

Given the fact that an image sensor designed for scenic images/video are not suitable for some biological measurements, such as, heart rate or blood pressure, many companies have introduced dedicated sensors specifically used for these measurements. For example, Samsung Galaxy 5 is equipped with a standalone detector to detect the heart rate. The location of such a sensor in a smart phone would require a user to move a body part (e.g., finger) in contact with or close to the sensor to allow the sensor to sense certain biological changes (e.g., fingertip pulse or blood volume changes) to derive a biological measurement. However, such a measurement can sometimes be misleading, causing unwanted concern, as the user may not position the sensor right on a preferable area of the body part. Thus, there is another need for sensors that are small in sizes but provide certain freedom to position a sensor onto or near a selected area of a body part.

More needs for various embodiments of the present invention can be appreciated in the following description.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to designs of a sensor module and its placement in a portable device. According to one aspect of the present invention, a sensor module is designed to take advantage of the architecture of CMOS sensors to capture biological changes in multiple areas of a body part to derive a measurement for blood. To increase the signal sensitivity, sensing elements or pixels in a sensor module may be dynamically adjusted or combined to effectively capture the biological changes in these areas.

According to another aspect of the present invention, multiple sensing signals are generated from multiple areas on a body part. These signals are preprocessed in analog or digital to increase the reliability and accuracy of the measurement on the body part.

According to still another aspect of the present invention, a software module or application is provided to control how the sensor module operates. Depending on what measurement is to get from a body part, a control signal is initiated via the application to define a number of zones in the sensor and a number of pixels in each of the zones to produce a sensing signal from such a zone.

According to still another aspect of the present invention, a light guide is provided to focal a reflected light onto a sensor. The light guide is made of a plurality of sheets, each of the sheets includes an array of holes, where the diameters of the holes and the distances between the holes may be different or equal from one sheet to another to form a plurality of inward light passages, when stacked.

According to still another aspect of the present invention, each of the sheets is a film, where the holes are formed by an opaque substance printed on the film, hence transparent (round) patches, to enhance the focusing of the light guide.

According to yet another aspect of the present invention, the sensing signals are digitized and analyzed in accordance with the control signal to derive from the multiple sensing areas an intended biological measurement (e.g., a heart rate or blood pressure).

The present invention may be implemented in various ways including a method, a circuit, an apparatus or a system.

According to one embodiment, the present invention is an integrated circuit of a sensor apparatus for both imaging device and a biological measurement, the integrated circuit comprises: an array of pixels, each of the pixels including one photosensor and generating a charge, wherein the charge represents a reflected light; a readout circuit generating sensing signals from charges of the pixels; and a post processing circuit provided to select N sets of sensing signals, the sensing signals in each of the N sets being from a group of pixels focusing on an area of a body part, wherein the N sets of sensing signals are used for deriving multiple measurements, and the biological measurement is concluded from the multiple measurements, and where N is an integer.

According to another embodiment, the present invention is a method for acquiring a biological measurement, the method comprises: generating charges from an array of pixels, each of the pixels including one photosensor, wherein each of the charges represents a reflected light from a body part; generating in a readout circuit sensing signals from the charges; and selecting N sets of the sensing signals, the sensing signals in each of the N sets being from a group of pixels focusing on an area of the body part, wherein the N sets of sensing signals are used for deriving multiple measurements, and the biological measurement is concluded from the multiple measurements, and where N is an integer.

According to still another embodiment, the present invention is a focusing module for acquiring sensing signals, the focusing module comprising: a light guide, with first and second sides, including a plurality of light passages slanted inwardly formed evenly from the first side towards a center of the second side, wherein the light guide, disposed on top of an array of photosensors, collects a reflected light from a human body part and focuses the reflected light onto the photosensors, each of photosensors generates a charge. The light guide may be made with a plurality of sheets, each of the sheets includes a transparent patch forming part of one of the light passages. The transparent patches on each of the sheets have their own diameters and centers of the transparent patches. The diameters of the transparent patches on the sheets may be identical or different depending on an implementation.

According to yet another embodiment, the present invention is a system for acquiring sensing signals via a focusing module. The system comprises an image sensor including an array of photosensors; a light guide, with first and second sides, including a plurality of light passages slanted inwardly formed evenly from the first side towards a center of the second side. The light guide, disposed on top of the image sensor, collects a reflected light from a human body part and focuses the reflected light onto the image sensor. Each of photosensors generates a charge from the reflected light. The light guide is integrated on top of the image sensor as the focusing module disposed under or next to a display screen.

Different objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

FIG. 2A shows a configuration diagram of a sensor including an array of sensing elements (e.g., photodiodes) and an array of lights;

FIG. 3A shows a block diagram of an exemplary system using a sensor according to one embodiment of the present invention;

FIG. 4A shows an exemplary placement of a sensor in a portable device, such as a smartphone, a tablet, or a laptop computer;

FIG. 4B shows an example of stacking sheets, each printed with a type of opaque material (e.g., black ink) to form an array of transparent patches thereon;

FIG. 6A shows a functional block diagram of a portable device equipped with one embodiment of the present invention.

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Embodiments of the invention are discussed below with reference to FIGS. 2A-6B. However, those skilled in the art will readily appreciate that the detailed description given herein with respect to these figures is for explanatory purposes as the invention extends beyond these limited embodiments. As used herein, any pronoun references to gender (e.g., he, him, she, her, etc.) are meant to be gender-neutral. Unless otherwise explicitly stated, the use of the pronoun "he", "his" or "him" hereinafter is only for administrative clarity and convenience. Additionally, any use of the singular or to the plural shall also be construed to refer to the plural or to the singular, respectively, as warranted by the context.

Figures 1A, 1B:
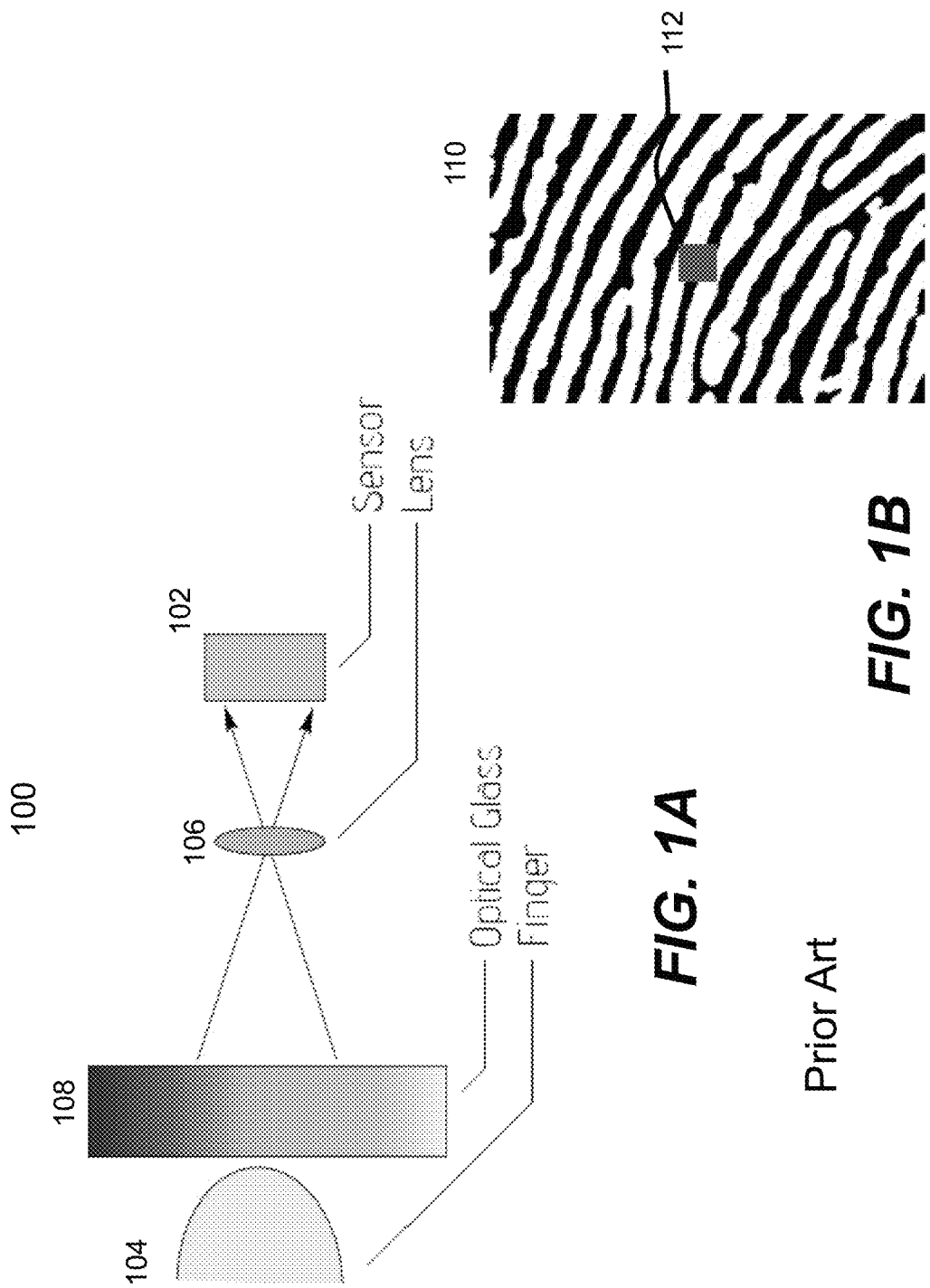
FIG. 1A shows a configuration in which an optical sensor is used to detect biological changes on a body part.
FIG. 1B shows an example of a partial finger image, where only a small area is captured or used by a sensor for the measurement of the biological changes in the finger.

FIG. 1A shows a configuration 100 in which an optical sensor 102 is used to detect biological changes on a body part 104. In general, an optical lens 106 is used to focus optical signals reflected from the body part 104 onto the sensor 102. The optical lens is a lens reduction type system to focus the large area of object plane to a small area of the image plane. A transparent substrate 108 (e.g., a piece of glass) is used to protect the sensor 102 and the lens 106 while holding the focal distance between the body part 104 and the lens 106. The total height of the whole module may be pretty high and would not be suitable for current smart phone applications.

Figure 1C:
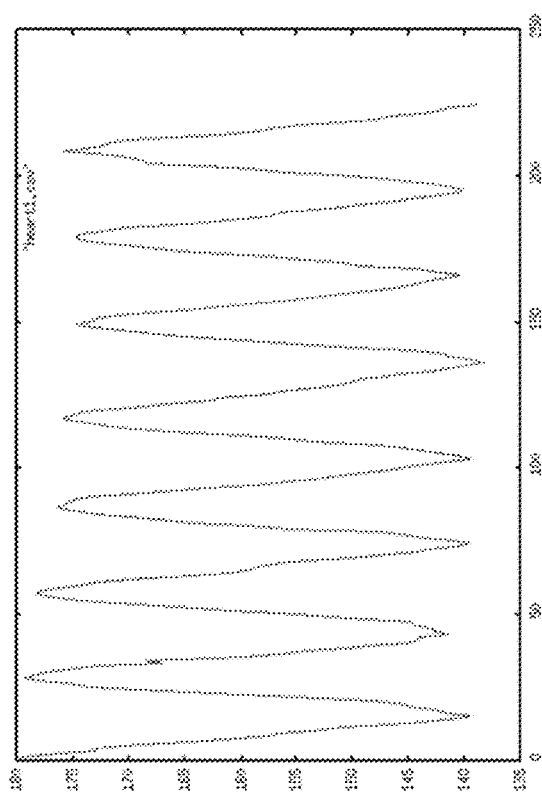
FIG. 1C shows a PPG signal (e.g., fingertip pulse) generated from the sensor from the area shown in FIG. 1B.

FIG. 1B shows an example of a partial finger image 110, where only a small area 112 is captured or used by the sensor 102 for the measurement of the biological changes in the finger. FIG. 1C shows a signal (e.g., fingertip pulse) generated from the sensor 102 from the area 112. It can be observed that the measurement of the biological changes in the finger could be changed or subject to errors as the area 112 changes. In other words, the measurement could be wrong if a user moves an undesirable part of his finger onto the focusing area of the sensor 102.

Referring now to the drawings, in which like numerals refer to like parts throughout the several views, FIG. 2A shows a configuration diagram of a sensor 200 including an array of sensing elements 202 (e.g., photodiodes) and an array of lights 204. According to one embodiment of the present invention, the sensing elements 202, or simply a sensor or sensors, are CMOS-based photodiodes with light guide 203, and the lights 204 are light-emitting diodes. Depending on an application of the sensor 200, the light-emitting diodes are controlled to generate an appropriate colored light (e.g., infrared, red) to facilitate the sensor to capture possible biological changes in a focused area of a body part.

In one embodiment, the sensing elements 202 form an array of predefined shape (e.g., square, rectangular or round). FIG. 2B shows an example of a square array of N×N pixels. Instead of focusing only one area of a body part, the sensor 200 can be controlled to focus onto multiple areas of the body part, resulting in simultaneous signals representing the biological changes in the areas. As an example, FIG. 2B shows that the five sensing areas 206 are configured or allocated to capture the biological changes in five independent areas of the body part. Through post-processing, one or more of these readouts for top to bottom or left to right may be used to derive a measurement (e.g., blood flow). As a result, not only is the measurement accuracy increased considerably, but the requirement of having a user to place the sensor onto a particular area of the body part or vise versa is much more relaxed.

Figure 2C:
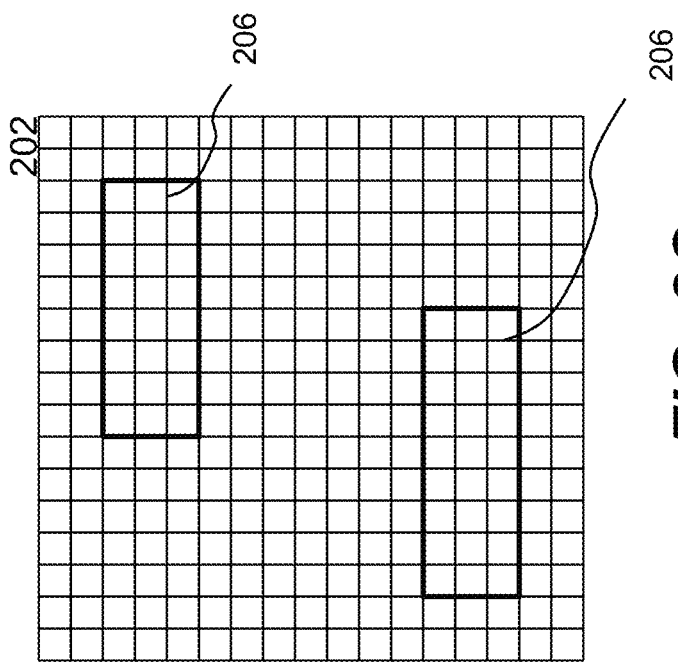
FIG. 2C shows another control of a sensing elements to sense two elongated but separated areas of a body part, from which two signals from the areas are generated and may be used to derive a more reasonable measurement.
Figure 2B:
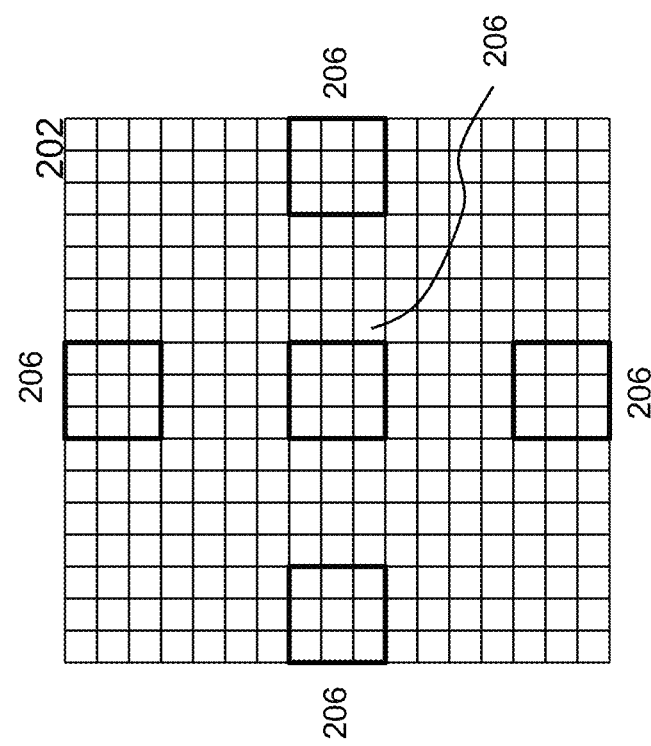
FIG. 2B shows an example of a square array of N×N pixels, only signals from certain areas of the pixels are effectively used.

FIG. 2C shows another control of the sensing elements 202 to sense two elongated but separated areas of a body part, from which two signals from the areas are generated and may be used to derive a more reasonable measurement. It should be noted to those skilled in the art that the number of sensing elements or photodiodes in each of a predefined area can be adjusted or controlled depending on a particular application. In some cases, the number of the sensing elements in a predefined area is enlarged to increase the sensitivity of the sensing on a particular area while in other cases the number of the sensing elements in a predefined area is limited but the number of areas from which sensing signals must be obtained may be increased. One of the key advantages, benefits or advantages in one embodiment of the present invention is to provide multiple readouts or sensing signals from a number of areas in a body part.

Referring now to FIG. 3A, it shows a block diagram of an exemplary multi function readout system 300 using a sensor (e.g., the sensor 200 of FIG. 2A) according to one embodiment of the present invention. The sensor or simply the array 302 is controlled to have one or more local exposures to certain areas. Given known dimensions of the array 302, the number of the sensing elements is defined and controlled to produce a number of readouts. Depending on operation, the sensing elements in the array 302 may be all or partially activated with all or only some of the sensing elements are selectively read out via a readout circuit (not shown) to measure either finger print pattern or biometrics data.

According to one embodiment, the readouts from the array 302 are preprocessed in a preprocessing circuit 304 to produce required sensing signals. For finger print application, all of the M×N sensing element need to readout to form an image pattern. Only a few frames may be needed for finger print recognition. For biometrics application, more frames are required to obtain the necessary PPG waveform. In this case, it is not necessary to read out all of the sensing elements. For example, there are five areas (as shown in FIG. 2B), the preprocessing circuit 304 may be designed to output five or less sensing signals, discarding other readouts from the array 302 when all are read out from the array 302. In another embodiment, the preprocessing circuit 304 may be designed to remove the inherent DC component from a sensing element to facilitate the measurement of biological changes in an area. The output signals from the preprocessing circuit 304 are selectively processed depending on what to derive from the sensing signals. As shown in FIG. 3A, a control signal (labeled as a function selection) is used to determine how the sensing signals are processed to derive therefrom a measurement (e.g., a heart rate).

An image processing unit 305 is provided to process the readouts from the preprocessing circuit 304. Depending on an implementation, some of the functions that are described above for the preprocessing circuit 304 may be implemented in the image processing unit 305, such as filtering out those sensing signals that seem to be too extreme. An extreme signal could happen from several sensing signals obtained from multiple areas, where one of the areas happens to be undesirable (e.g., dirt, scare, or discolored skin). The removal of an extreme signal among several sensing signals in a group may improve the accuracy of the readings on a body part.

Figure 3B:
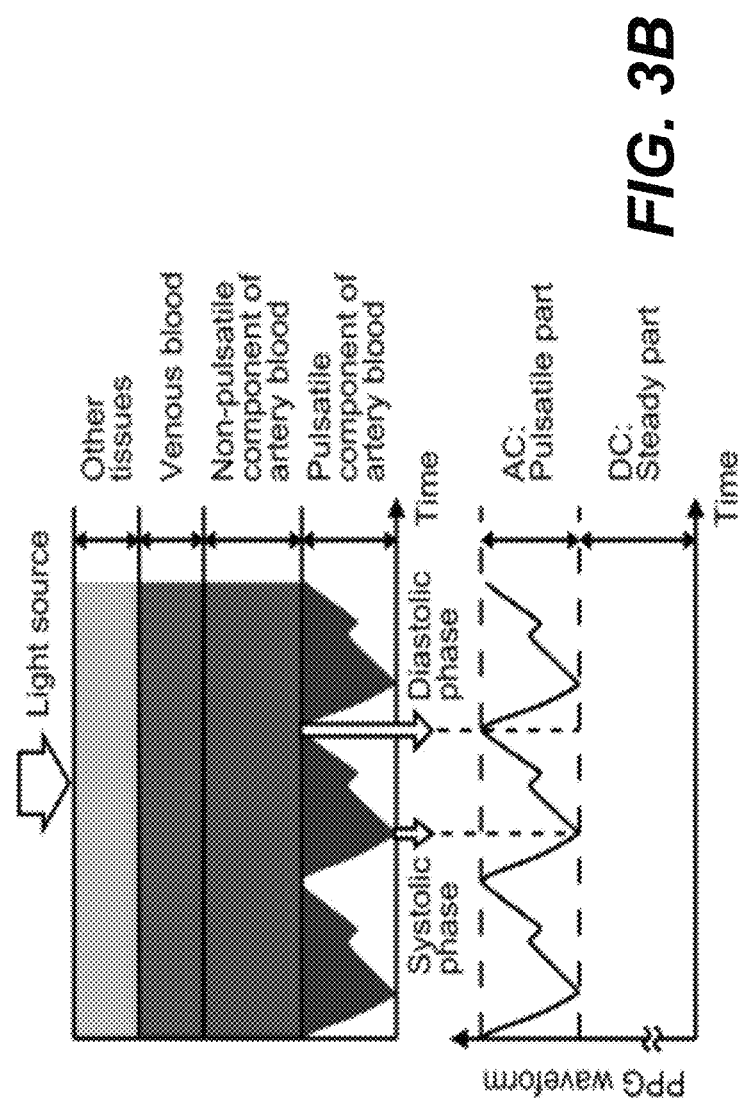
FIG. 3B shows an example of a photoplethysmographic (PPG) waveform that can be captured by a portion of a sensor.

A processing unit 306 is provided to perform some additional signal process and may be referred to as 'enhancer" to enhance the signals per the control signal. In one example, readouts from several pixels are combined to enhance the sensitivity of the measurement around an area covered by these pixels. In another example, readouts from several pixels are accumulated to enhance or increase the signal-to-noise ratio for an area being sensed. According to one embodiment, a DC component is removed from the signals from the preprocessing circuit 304. FIG. 3B shows an example of a photoplethysmographic (PPG) waveform. A PPG waveform can be captured by a portion of the sensor 302, hence several PPG waveforms may be generated from the sensor 302. A PPG waveform includes both direct current (DC) and alternating current (AC) components. The DC component of the PPG waveform corresponds to a detected transmitted or reflected optical signal from a part of tissue, and depends on the structure of the tissue and the average blood volume of both arterial and venous blood. The AC component shows changes in the blood volume that occurs between the systolic and diastolic phases of the cardiac cycle. In other words, the fundamental frequency of the AC component depends on the heart rate and is superimposed onto the DC component. In one embodiment, the processing unit 306 is designed to remove the DC component from the PPG waveform, and output only the AC component.

It should be noted that preprocessing circuit 304, image processing unit 305 and data processing unit 306 are not necessarily separate circuits. Depending on an implementation, they can be implemented in one or more ICs. The processed signals are then digitized at 307 and the data from the digitizer 307 is then sent to a different processor 308 or 309 to derive a specific measurement.

Not specifically shown in FIG. 3A but indicated in FIG. 2A, there are LEDs 204 that are designed and controlled to work with the sensor of FIG. 3A. According to one embodiment, the color of the LED lights is selectable, for example either blue, green, red or infrared (IR) or else. In general, human body parts do not absorb IR light well, therefore it can penetrate ~10× deeper than other colored lights (e.g., blue or green LEDs). Blood absorbs more light than the surrounding tissue. Therefore, a reduction in the amount of blood is detected as an increase in the intensity of the detected light and vice versa. The wavelength and distance between the light source and photo detector (PD) determine the penetration depth of the light. In one embodiment, two or more different colored lights are used. For example, the light source 204 of FIG. 2A is controlled to generate two different colored lights, red and near inferred red (NIR). Red light source can reflect more concentration of deoxygenated hemoglobin [C(Hb)] whereas NIR light source can reflect more concentration of oxygenated hemoglobin [C(HbO$_2$)] on the blood. By used two different colors of the light source, the blood oximeter may be more effectively detected and measured.

Figure 3C:
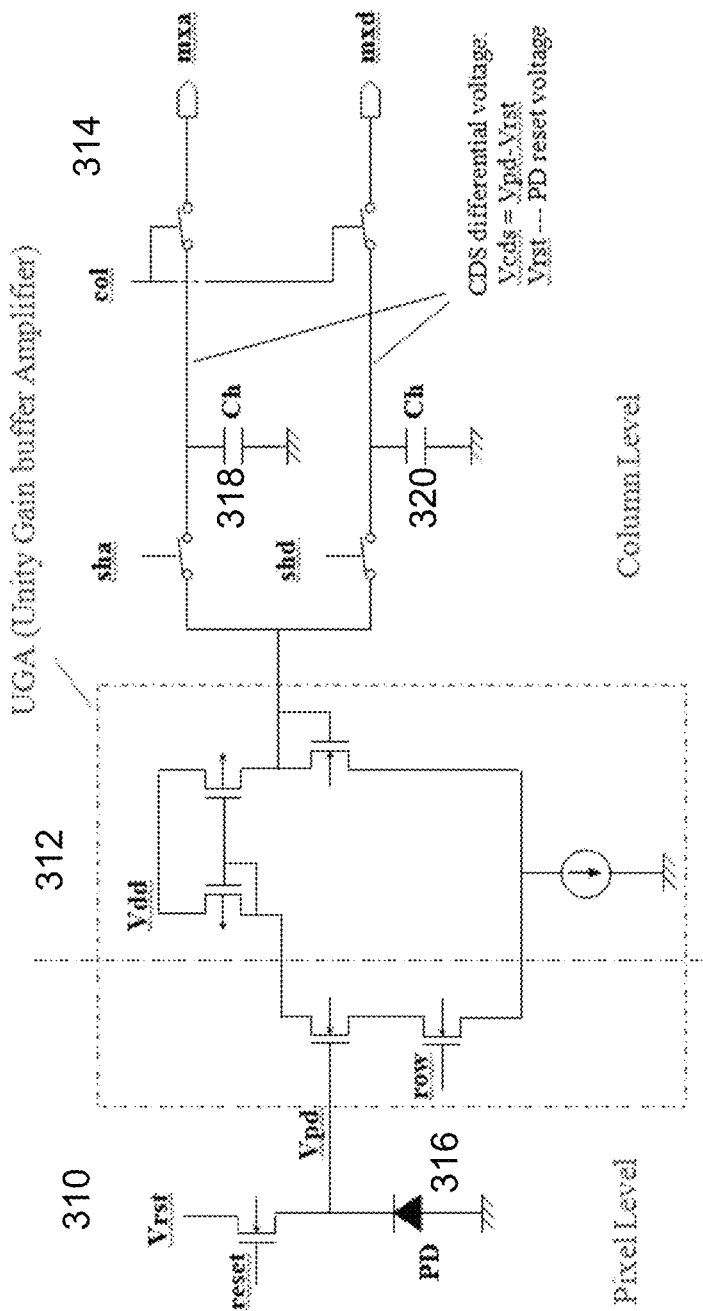
FIG. 3C shows an exemplary APS pixel circuit including a pixel element and an active amplifier followed by a readout circuit.

According to one embodiment, a sensing element is implemented as an active-pixel sensor (APS). As shown in FIG. 3C, an APS pixel is an integrated circuit including a pixel element 310 and an active amplifier 312, followed by a readout circuit 314. The pixel element 310 further includes a photodiode 316 that is controlled to be turned on or off. The amplifier 312 is an amplifier provided to amplify the signal produced by the photodiode 316. As an example shown in FIG. 3C, the amplifier 312 is implemented with what is called unity gain buffer amplifier (UGBA). As the name suggests, the amplifier is one that provides electrical impedance transformation from one circuit to another, with the aim of preventing a signal source from being affected by whatever currents or voltages that the load may produce. The readout circuit 314 in FIG. 3C uses an exemplary readout circuit provided to read out the charge accumulated in proportional to the intensity of the light impinged on the diode 316. As an example, the readout circuit 314 is implemented with correlated double sampling (CDS) circuitry to read out the sensing signal from the pixel 310. Another amplifier (not shown) may also be added as a charge integrator to produce a final sensing signal to be coupled for digitization.

The correlated double sampling, or CDS, circuitry is a method employed to improve the signal to noise ratio (S/N) of an image sensor by reading out the pixel 310 twice. The first readout happens right after the exposure of the sensor to a scene. The second readout happens without the sensor is exposed to the scene but soon after the first readout has successfully occurred. Accordingly, the first readout is herein referred to as actual light-induced signal while the second readout is referred to as a reference signal. The reference signal is largely coming from internal dark or reference output level in the pixel. By subtracting the reference output signal from the actual light-induced signal, static fixed pattern noise (FPN) and several types of temporal noise are effectively removed from the output of the sensor. In operation, the first readout of the signal from the photo detector 316 is stored on a capacitor 318 and the second readout the signal from the photo detector 316 is stored on a capacitor 320. The final readout of the signal is the difference between the signals on the capacitors 318 and 320. Depending on an implementation, the APS pixel can be selected to capture what is being focused on (e.g., a point of a finger) or read out the final charge. When used in a group to capture biological changes in an area of a body part, final charges from a group of ADS pixels can be read out and further processed in a pre-processing circuit 304 of FIG. 3A.

Figure 3D:
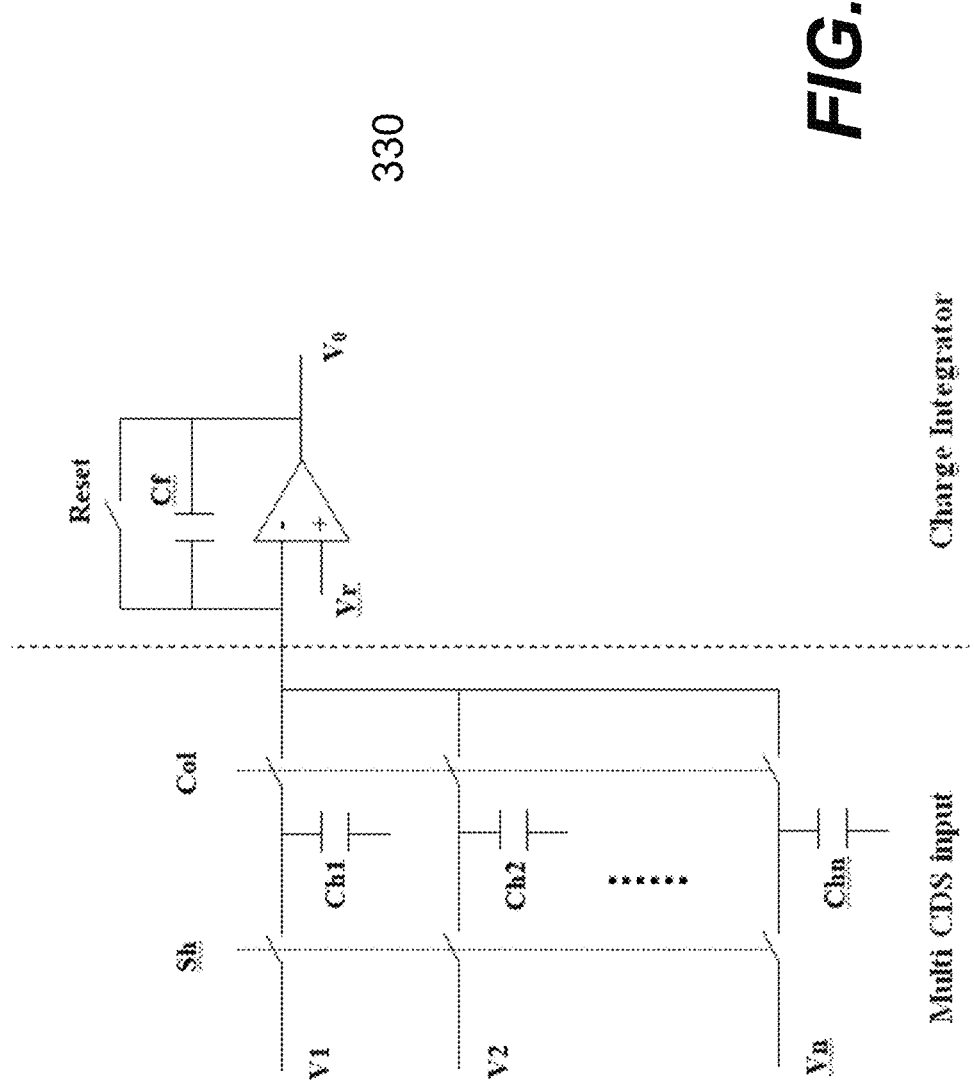
FIG. 3D shows an exemplary integrator to integrate n charges from n pixels.

FIG. 3D shows an exemplary integrator to integrate n charges from n pixels. The n charges are respectively stored in n capacitors Ch1, Ch2, ..., Chn of the n pixels. The total charges Qt can be expressed in the following:

in sampling mode:

$$Qt = Q1 + Q2 + \ldots + Qn = (V1-Vr) \times Ch1 + (V2-Vr) \times Ch2 + \ldots + (Vn-Vr) \times Chn$$

in readout mode: the charges are transferred to Cf, thus $$Qf = (Vr-Vo) \times Cf$$

In one embodiment, Qf=Qt, the output Vo is expressed as follows:

$$Vo = -[(V1-Vr) \times Ch1 + (V2-Vr) \times Ch2 + \ldots + (Vn-Vr) \times Chn]/Cf + Vr$$

It is supposed that $V1=V2=\ldots=Vn=Vi$, and $Ch1=Ch2=\ldots=Chn=Ch$, the output Vo can be rewritten as follows:

$$Vo = -nCh/Cf \times (Vi-Vr) + Vr$$

Thus it can be concluded that the signal of a sensor area with n pixels is read out with gain of −n Ch/Cf, where n is the number of the inputs to the CDS.

Figure 3E:
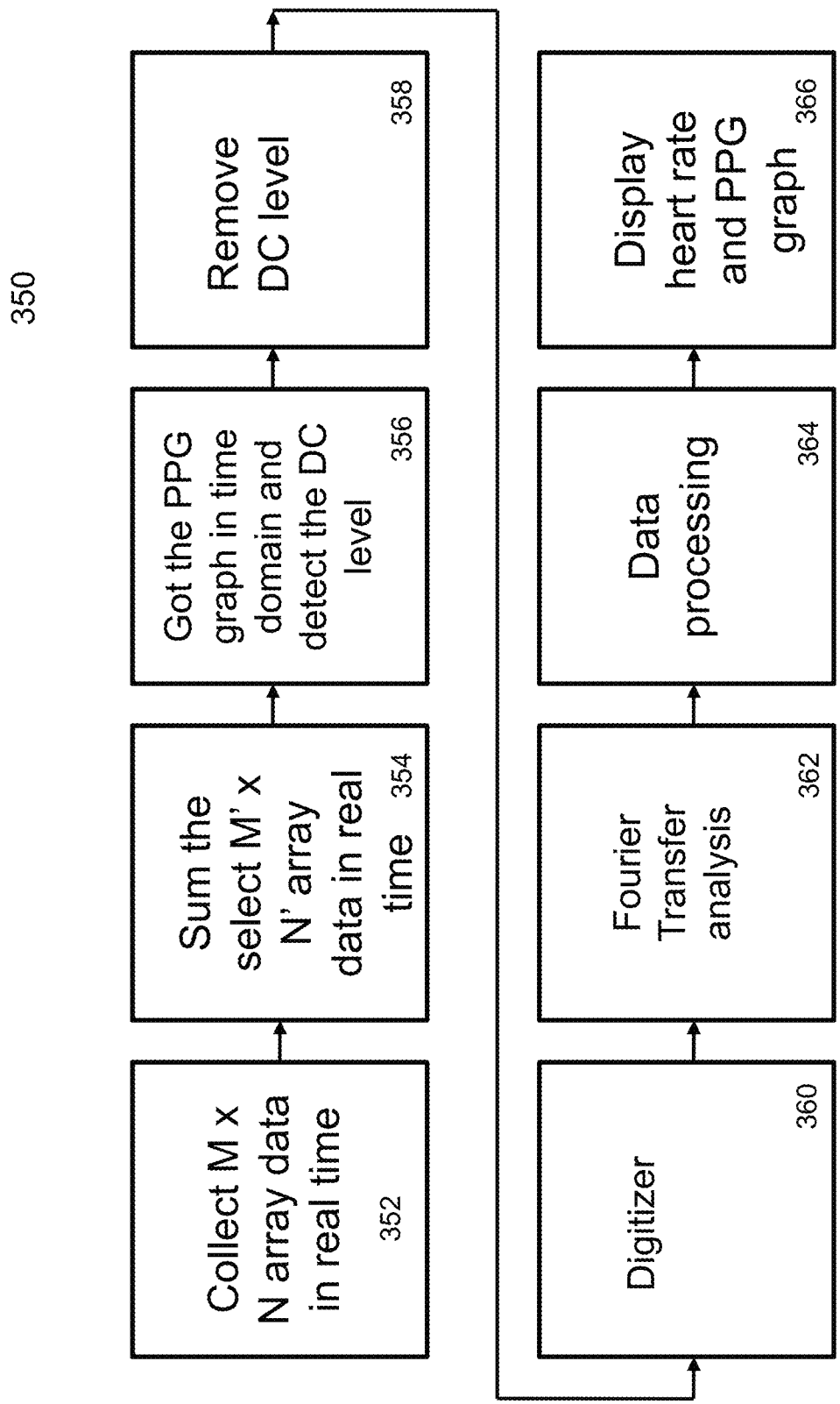
FIG. 3E shows a flowchart or process that may be implemented in hardware (e.g., integrated circuit) or a combination of hardware or software.

Referring now to FIG. 3E, it shows a flow chart or process 350 to measure the biometrics data (e.g., heart rate, ...) that may be implemented in hardware or a combination of hardware or software. FIGS. 2A-3D may be referenced to better understand FIG. 3E according to one embodiment.

At 352, sensing signals from an array of M×N are collected. As described above, a sensor is used to sense a plurality of areas of a body part, several sensing elements are combined to form a large size of a sensing area so as to form a M'×N' of array 354 (less resolution than the array of M×N). This process will reduce the noise and increase the SNR to biometrics measurement. Accordingly, the received signals are elected per the predefined areas. It is assumed that a group of 49 (e.g., 7×7) pixels is designated to sense an area, sensing signals from these 49 pixels will be selected and added up, as if there was one captured signal from the area. The signal was captured for a period of time, hence a waveform. It is further assumed that the signal was captured for measuring a heart rate at 356, where the waveform is a PPG. At 358, the DC component is removed.

The selected sensing signals are digitized at 360 to generate a set of or sets of data. The data can now be processed in digital or by a dedicated module being executed by a processor at 364. The result of the data processing at 364 is shown to a display screen at 366, were the user sees the result right after the measurements were took.

Referring now to FIG. 4A, it shows an exemplary placement of a sensor (e.g., the sensor 200 of FIG. 2A) in a portable device, such as a smart phone, a tablet, or a laptop computer. One of the features in the embodiment of FIG. 4A is the use of an optical light guide to direct the reflected object image onto the sensing elements. According to one embodiment, the sensor 402 is placed under a display screen 404, where the display screen 404 has considerable transparency, allowing sufficient light to pass through. Examples of such display screen may include, but not limited to, an OLED or micro LED display. When a body part 406 is placed against the screen 404 and illuminated by a light source (not shown), a light guide 408 is provided to focus the reflected light from the body part 406 to the sensor 402. The activated sensing elements in the sensor 402 generate analog signals 410 that are then digitized to produce digital signals or data 412 for deriving there from a measurement.

Figure 4D:
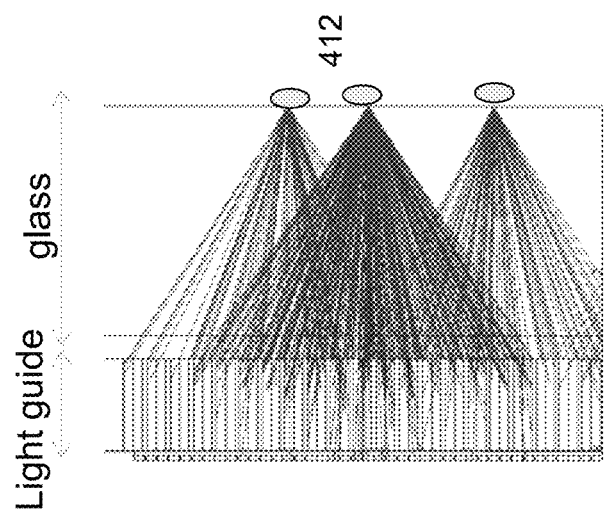
FIG. 4D shows a light guide with straight passages.
Figure 4C:
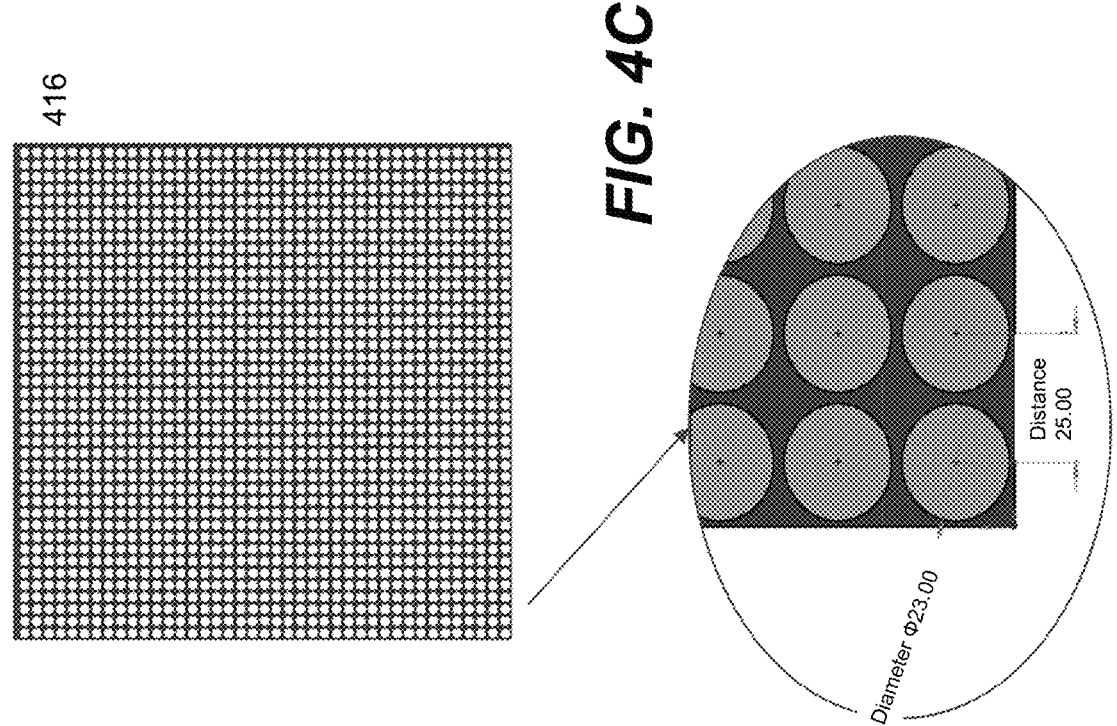
FIG. 4C shows one exemplary perforated sheet, where the holes are made equal or slightly changed in diameters.

FIG. 4B shows an enlarged view of the light guide 408 that includes layers of materials (e.g., sheets or films) providing slanted inward optical passages. FIG. 4C shows one exemplary perforated sheet 416, where the holes are made equal or slightly changed in diameters. According to one embodiment, these holes are not physically hollow and may be just transparent for easy alignment or placement among other sheets. In other words, each of perforated sheets has its own center positions and diameter of the holes. The centers and diameters of the holes on all the sheets are so aligned that the resulting passages formed by the holes are inwardly slanted when these sheets are stacked as shown in FIG. 4B. According to one embodiment, these sheets are made from films, where the holes are formed by the opaque (or black) printed on the films.

It may be appreciated to those skilled in the art that the slanted inward passages represent the optical characteristics of a focal lens or a set of focal lenses. These slanted inward passages allow reflected lights from an object placed upon the glass 404 to fall on the sensors 402 mounted under the light guide 408. As a comparison, FIG. 4D shows a light guide with straight passages. The lights (reflected) from an object would hit on the walls of the passages, which can cause a reduction of the incoming light intensity. With the slanted inward passages, the total internal reflection may be induced to allow the incoming light to fully pass through onto the sensors. Total internal reflection is well known in the art that a phenomenon happens when a propagating wave strikes a medium boundary at an angle larger than a particular critical angle with respect to the normal to the surface. The critical angle is the angle of incidence above which the total internal reflectance occurs.

Figure 5A:
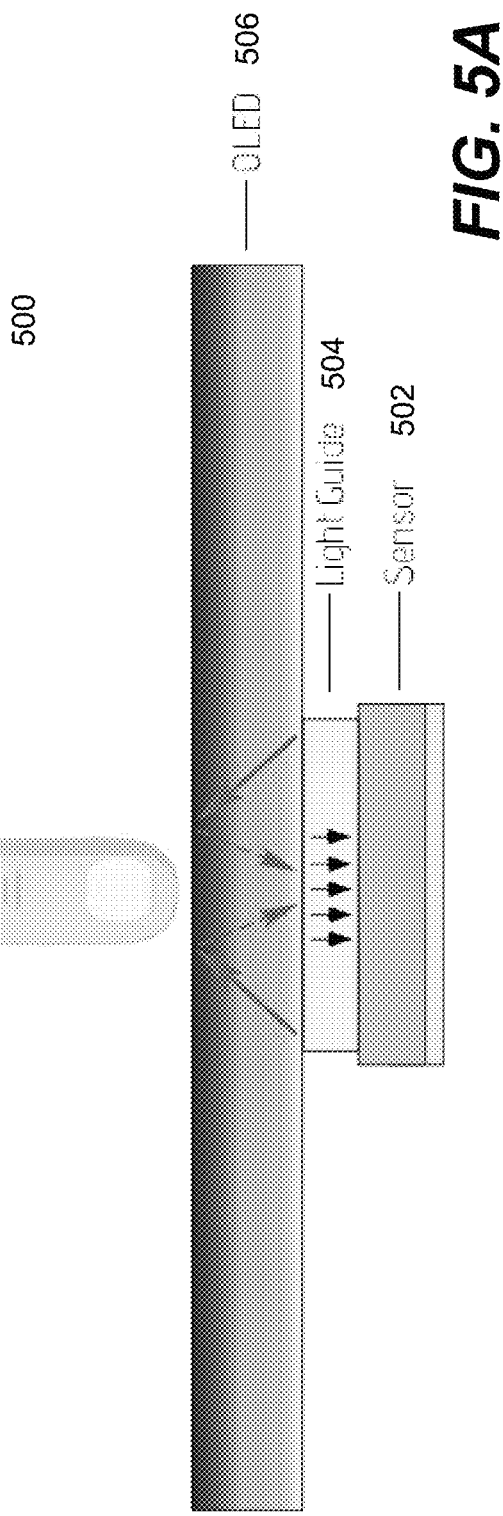
FIG. 5A shows a simplified cross-section of what is referred to herein as a placement under display.

FIG. 5A shows a simplified cross-section 500 of what is referred to herein as a placement under display. This exemplary placement works perfect with a display screen 506 that is substantially transparent at an operation. For example, an OLED screen, though not completely transparent, allows most of the light to pass through when it is not driven to display a bright colorful image. One of the advantages of placing a package including the light guide 504 and the sensor 502 under the display screen 506 is that it is operationally feasible for a smart phone manufacturer to equip their smart phones with the capability of providing the POC Testing, along with an application preinstalled or downloadable from a designated server (e.g., Apple Store).

Figure 5B:
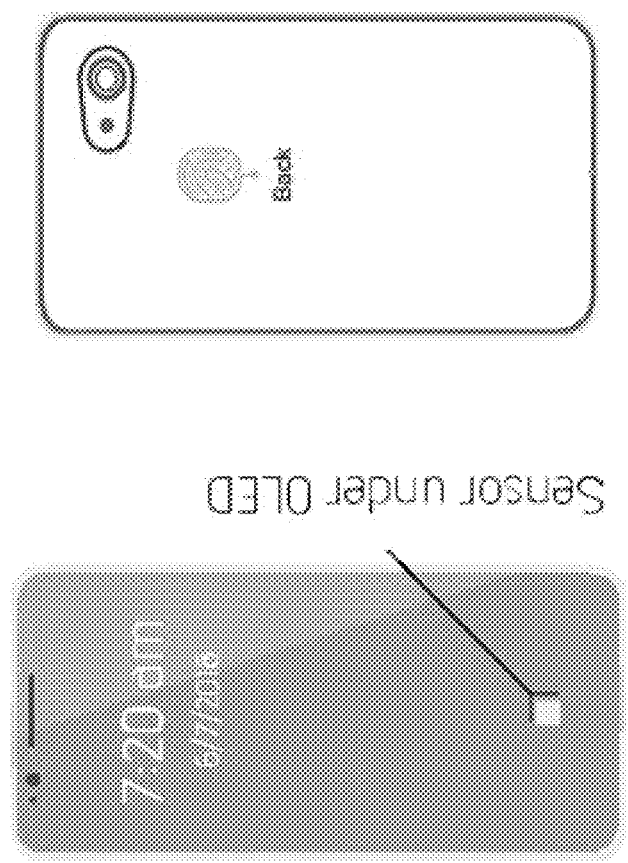
FIG. 5B shows an exemplary smart phone in which a package including a light guide and a sensor is disposed on the back of the smart phone.
Figure 5C:
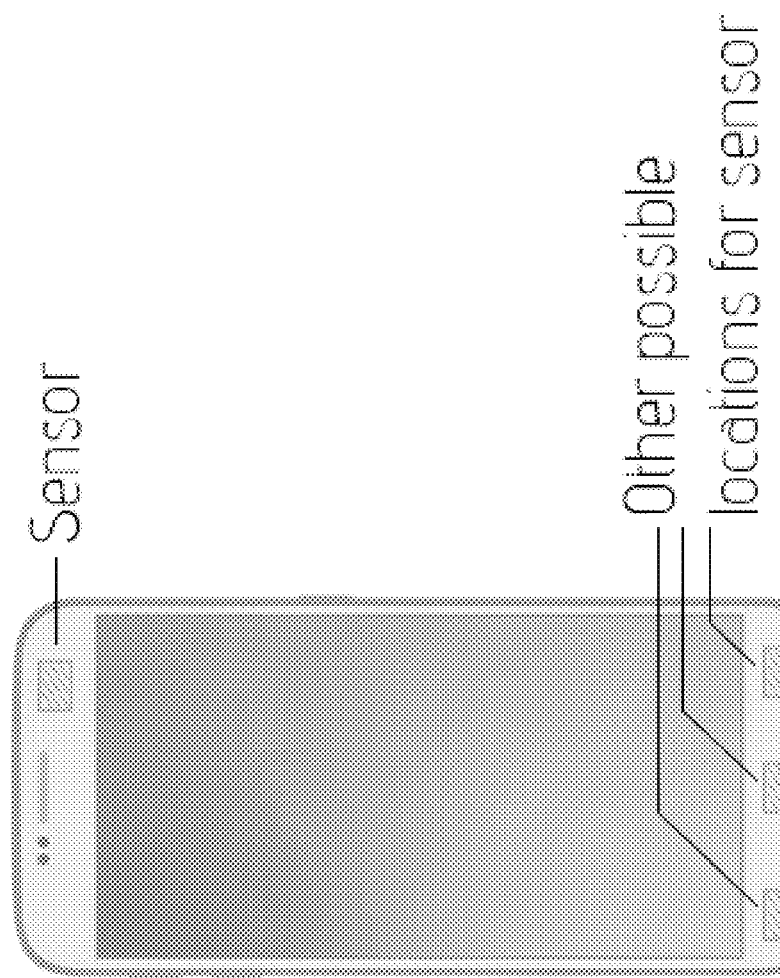
FIG. 5C shows other possible locations of the package.

There are display screens that won't allow lights to pass through, the package including the light guide 504 has to be placed or exposed to surface of a portable. FIG. 5B shows an exemplary smart phone in which the package is disposed on the back of the smart phone. FIG. 5C shows other possible locations of the package.

FIG. 6A shows a functional block diagram of a portable device equipped with one embodiment of the present invention. The portable device includes a microprocessor or microcontroller 602, a memory space 604 (e.g., RAM or flash memory) in which there is a sensor module 606 for acquiring biological signals, an input interface 608, an application module 609, a screen driver 610 to drive a display screen 612 and a network interface 614. The client module 606 may be implemented as an application implementing one embodiment of the present invention, and downloadable over a network from a library (e.g., Apple Store) or a designated server.

The input interface 608 includes one or more input mechanisms. A user may use an input mechanism to interact with the device 600 by entering a command to the microcontroller 602. Examples of the input mechanisms include a microphone or mic to receive an audio command and a keyboard (e.g., a displayed soft keyboard) to receive a click or texture command. Another example of an input mechanism is a camera provided to capture a photo or video, where the data for the photo or video is stored in the device for immediate or subsequent use with other module(s) or application(s). The driver 610, coupled to the microcontroller 602, is provided to take instructions there from to drive the display screen 612. In one embodiment, the driver 610 is caused to drive the display screen 612 to display an image or images (e.g., an ad banner) or play back a video (e.g., an ad video). The network interface 614 is provided to allow the device 600 to communicate with other devices via a designated medium (e.g., a data network).

According to one implementation, the client module 606 is loaded in the memory 604 and executed by the controller 602 to receive. The client module 606 is designed to cause the display screen 612 to display an interface to receive some input (e.g., name, age or gender). The client module 606 is also designed to acquire other information automatically from the device 600, for example, the time, location, or temperature. In one embodiment, a display is shown to allow a user to choose what to measure (a selection), for example, a heart rate, a blood pressure, a blood flow, blood oximeter or other biological measurement. When a selection is made, the display shows an instruction how and where to have the sensor 609 in close contact with a body part, for example, a finger. Once all is ready, the client module 606 initiates the measurement via the microcontroller 602.

Figure 6B:
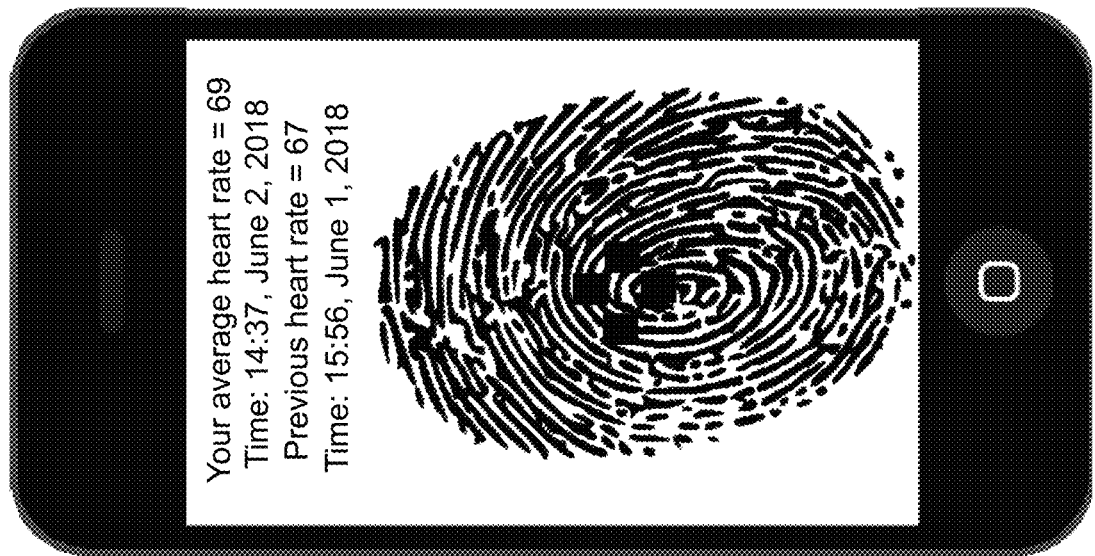
FIG. 6B shows an exemplary display, where an indication of measurements on multiple areas of a finger is also shown.

As described above, the sensing signals are generated, read out, preprocessed and digitized in accordance with the selection in one embodiment. The client module 606 deals now with sensing data or simply data. Algorithms for deriving corresponding logical measurements are implemented in the client module 606. Per the selection, one of the algorithms is activated to receive the data. The data is further selected from a set of predefined pixels corresponding to respective areas of a body part. The selected data is used with the activated algorithm to derive the logical measurement. In one embodiment, the measurement may be repeated with different sets of data corresponding to different areas of the body part, when the measurement derived is way off from a previous measurement. The final result is shown on the screen 612 and sent to a designated part with the permission of the user. FIG. 6B shows an exemplary display, where an indication of measurements on multiple areas of a finger is also shown.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Accordingly, the scope of the present invention is defined by the appended claims rather than the forgoing description of embodiments.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A focusing module for acquiring sensing signals, the focusing module comprising:
a light guide with first and second sides, including a plurality of light passages slanted inwardly formed evenly from the first side towards a center of the second side, wherein the light guide, disposed on top of an array of photosensors, collects a reflected light from a human body part and focuses the reflected light through the light passages onto the photosensors, each of photosensors generates a charge, wherein the light guide is made with a plurality of sheets, each of the sheets includes a transparent patch forming part of one of the light passages.

2. The focusing module as recited in claim 1, wherein transparent patches on each of the sheets have their own diameters and centers of the transparent patches.

3. The focusing module as recited in claim 2, wherein all of the sheets are stacked to form the light passages slanted inwardly formed evenly from the first side towards the center of the second side.

4. The focusing module as recited in claim 3, wherein the first side of the light guide is larger than the array of photosensors in size, and the centers of the transparent patches on the plurality of sheets are progressively moving towards the center of the second side.

5. The focusing module as recited in claim 3, wherein the transparent patches are round in shape and formed by blackening each of the sheets except for areas of the transparent patches.

6. The focusing module as recited in claim 3, wherein each of the sheets is painted to form the transparent patches.

7. The focusing module as recited in claim 1, wherein the light guide is disposed under a display screen to collect the reflected light from the human body part via the display screen, and wherein the human body part is placed against the display screen.

8. The focusing module as recited in claim 7, wherein the display screen is part of a mobile device.

9. The focusing module as recited in claim 1, wherein the light guide is disposed next to a display screen to collect the reflected light from the human body part, and wherein the human body part is placed upon the second side of display screen.

10. The focusing module as recited in claim 9, wherein the light guide is disposed under a display screen to collect the reflected light from the human body part via the display screen, and wherein the human body part is placed against the display screen.

11. The focusing module as recited in claim 10, wherein the image sensor is part of a mobile device.

12. A system for acquiring sensing signals via a focusing module, the system comprising:
an image sensor including an array of photosensors;
a light guide with first and second sides, including a plurality of light passages slanted inwardly formed evenly from the first side towards a center of the second side, wherein the light guide, disposed on top of the image sensor, collects a reflected light from a human body part and focuses the reflected light through the light passages onto the image sensor, each of photosensors generates a charge, and
wherein the light guide is made with a plurality of sheets, each of the sheets includes a transparent patch forming part of one of the light passages.

13. The focusing module as recited in claim 12, wherein transparent patches on each of the sheets have their own diameters and centers of the transparent patches.

14. The focusing module as recited in claim 13, wherein all of the sheets are stacked to form the light passages slanted inwardly formed evenly from the first side towards the center of the second side.

15. The focusing module as recited in claim 14, wherein the first side of the light guide is larger than the image sensor in size, and the centers of the transparent patches on the plurality of sheets are progressively moving towards the center of the second side.

16. The focusing module as recited in claim 14, wherein the transparent patches are round in shape and formed by blackening each of the sheets except for areas of the transparent patches.

17. The focusing module as recited in claim 14, wherein each of the sheets is painted to form the transparent patches.

* * * * *